United States Patent
Chai et al.

(10) Patent No.: US 11,785,267 B1
(45) Date of Patent: Oct. 10, 2023

(54) VIRTUAL LIVESTREAMING METHOD, APPARATUS, SYSTEM, AND STORAGE MEDIUM

(71) Applicants: MOFA (SHANGHAI) INFORMATION TECHNOLOGY CO., LTD., Shanghai (CN); SHANGHAI MOVU TECHNOLOGY CO., LTD., Shanghai (CN)

(72) Inventors: Jinxiang Chai, Shanghai (CN); Hongbing Tan, Shanghai (CN); Xingtang Xiong, Shanghai (CN); Shihao Jin, Shanghai (CN); Bo Liu, Shanghai (CN); Tonghui Zhu, Shanghai (CN); Congyi Wang, Shanghai (CN)

(73) Assignees: MOFA (SHANGHAI) INFORMATION TECHNOLOGY CO., LTD., Shanghai (CN); SHANGHAI MOVU TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/028,437

(22) PCT Filed: Aug. 3, 2021

(86) PCT No.: PCT/CN2021/110345
§ 371 (c)(1),
(2) Date: Mar. 24, 2023

(87) PCT Pub. No.: WO2022/062678
PCT Pub. Date: Mar. 31, 2022

(30) Foreign Application Priority Data

Sep. 25, 2020 (CN) .......................... 202011023760.6

(51) Int. Cl.
*H04N 21/2187* (2011.01)
*G06T 13/40* (2011.01)
(Continued)

(52) U.S. Cl.
CPC ......... *H04N 21/2187* (2013.01); *G06T 13/40* (2013.01); *G06T 15/20* (2013.01); *H04N 21/816* (2013.01)

(58) Field of Classification Search
None
See application file for complete search history.

(56) References Cited

U.S. PATENT DOCUMENTS

2015/0035825 A1* 2/2015 Zhou .................. G06T 7/251
345/419
2015/0195509 A1 7/2015 Phipps
(Continued)

FOREIGN PATENT DOCUMENTS

CN 107248195 A 10/2017
CN 107274465 A 10/2017
(Continued)

OTHER PUBLICATIONS

The International Search Report dated Oct. 28, 2021, for Application No. PCT/CN2021/110345 (five (5) pages).
(Continued)

*Primary Examiner* — Peter Hoang
(74) *Attorney, Agent, or Firm* — KDW Firm PLLC

(57) ABSTRACT

Provided are a virtual livestreaming method, apparatus, and system, and a storage medium, relating to the technical field of livestreaming. The method is acquiring real feature data of a real subject, where the real feature data include motion data and face data of the real subject during a performance; determining target feature data of a virtual character according to the real feature data, where the virtual character is a
(Continued)

preset animation model, and the target feature data include motion data and face data of the virtual character; determining video stream pushing data corresponding to the virtual character according to the target feature data; and sending the video stream pushing data corresponding to the virtual character to a target livestreaming platform, where the video stream pushing data is used for instructing the target livestreaming platform to display virtual livestreaming of the virtual character.

16 Claims, 4 Drawing Sheets

(51) Int. Cl.
    *G06T 15/20*     (2011.01)
    *H04N 21/81*     (2011.01)

(56) References Cited

U.S. PATENT DOCUMENTS

2020/0074738 A1    3/2020   Hare et al.
2021/0350566 A1*  11/2021   Hu .......................... G06V 10/82

FOREIGN PATENT DOCUMENTS

| CN | 107274466 A | 10/2017 |
|----|-------------|---------|
| CN | 107277599 A | 10/2017 |
| CN | 107438183 A | 12/2017 |
| CN | 108986190 A | 12/2018 |
| CN | 110149332 A | 8/2019 |
| CN | 110502120 A | 11/2019 |
| CN | 110650354 A | 1/2020 |
| CN | 110766777 A | 2/2020 |
| CN | 111970535 A | 11/2020 |

OTHER PUBLICATIONS

The First Office Action dated Feb. 26, 2021 of prior application No. 202011023760.6 (15 pages).
The Second Office Action dated May 18, 2021 of prior application No. 202011023760.6 (17 pages).
The First Office Action dated Feb. 26, 2021 for Chinese Patent Application No. 202011023760.6 (15 pages).
The Second Office Action dated May 18, 2021 for Chinese Patent Application No. 202011023760.6 (17 pages).

* cited by examiner

US 11,785,267 B1

VIRTUAL LIVESTREAMING METHOD, APPARATUS, SYSTEM, AND STORAGE MEDIUM

CROSS-REFERENCE TO RELATED APPLICATIONS

This is a National Stage Application filed under 35 U.S.C. 371 based on International Patent Application No. PCT/CN2021/110345, filed on Aug. 3, 2021, which claims priority to Chinese Patent Application No. 202011023760.6 filed on Sep. 25, 2020, the disclosures of both of which are incorporated herein by reference in their entireties.

TECHNICAL FIELD

The present disclosure relates to the technical field of livestreaming and, in particular, to a virtual livestreaming method, apparatus, and system, and a storage medium.

BACKGROUND

Virtual livestreaming is a livestreaming form through which a virtual character is used to perform a submission activity on a livestreaming platform.

In the related art, a main method of virtual livestreaming includes acquiring a limb motion of a real streamer through an inertial capture device, and then driving a virtual character in a manner matched with premade expression control.

Obviously, the virtual livestreaming generated by the preceding method has poor display effect and is only suitable for low-quality livestreaming applications. A reasonable and effective technical solution has not been provided in the related art.

SUMMARY

In view of the above, the present disclosure provides a virtual livestreaming method, apparatus, and system, and a storage medium. The technical solution includes the following.

According to a first aspect of the present disclosure, a virtual livestreaming method is provided. The method includes acquiring real feature data of a real subject, where the real feature data include motion data and face data of the real subject during a performance; determining target feature data of a virtual character according to the real feature data, where the virtual character is a preset animation model, and the target feature data include motion data and face data of the virtual character; determining video stream pushing data corresponding to the virtual character according to the target feature data; and sending the video stream pushing data corresponding to the virtual character to a target livestreaming platform, where the video stream pushing data is used for instructing the target livestreaming platform to display virtual livestreaming of the virtual character.

In a possible embodiment, determining the video stream pushing data corresponding to the virtual character according to the target feature data includes determining the video stream pushing data corresponding to the virtual character according to the target feature data and preset motion data when a first trigger instruction is received, where the preset motion data is used for instructing a preset skeletal motion of the virtual character.

In another possible embodiment, determining the video stream pushing data corresponding to the virtual character according to the target feature data includes determining the video stream pushing data corresponding to the virtual character according to the target feature data and preset special effect data when a second trigger instruction is received, where the preset special effect data is used for instructing a preset virtual special effect of the virtual character.

In another possible embodiment, determining the video stream pushing data corresponding to the virtual character according to the target feature data includes acquiring reference data, where the reference data include sound recording data and/or virtual camera position and pose data of the real subject during the performance; and determining the video stream pushing data corresponding to the virtual character according to the target feature data and the reference data.

In another possible embodiment, the target feature data and the reference data both carry timecodes. Determining the video stream pushing data corresponding to the virtual character according to the target feature data and the reference data includes aligning the target feature data and the reference data according to the time code corresponding to the target feature data and the time code corresponding to the reference data; and determining the video stream pushing data corresponding to the virtual character according to the target feature data and reference data after alignment processing.

In another possible embodiment, determining the video stream pushing data corresponding to the virtual character according to the target feature data and reference data after alignment processing includes obtaining an animation picture according to the virtual camera position and pose data and target feature data after alignment processing, where the virtual camera position and pose data is used for instructing a preview camera viewing angle of a to-be-generated animation picture; rendering the animation picture to obtain a render result; and determining the video stream pushing data corresponding to the virtual character according to the render result and the sound recording data.

In another possible embodiment, acquiring the real feature data of the real subject includes acquiring the motion data of the real subject, where the motion data include limb motion data and/or gesture motion data; and acquiring the face data of the real subject, where the face data include expression data and/or eye expression data.

In another possible embodiment, acquiring the motion data of the real subject includes acquiring position data corresponding to each of a plurality of optical mark points preset on a limb of the real subject, and determining the limb motion data of the real subject according to the position data corresponding to the each of the plurality of optical mark points; and/or, acquiring position data corresponding to each of a plurality of optical mark points preset on a hand of the real subject, and determining the gesture motion data of the real subject according to the position data corresponding to the each of the plurality of optical mark points.

In another possible embodiment, acquiring the face data of the real subject includes acquiring face video frames of the real subject, where the face video frames are video frames including the face of the real subject, and the face video frames are used for instructing the face data of the real subject.

In another possible embodiment, determining the target feature data of the virtual character according to the real feature data includes converting the real feature data into virtual feature data of a virtual subject, where the virtual subject is a virtual model obtained by restoring and reconstructing the real subject, and the virtual feature data include motion data and face data of the virtual subject; and redirecting the virtual feature data to obtain the target feature data of the virtual character.

In another possible embodiment, redirecting the virtual feature data to obtain the target feature data of the virtual character includes redirecting the motion data of the virtual subject to obtain the motion data of the virtual character, where the motion data include limb motion data and/or gesture motion data; and redirecting the face data of the virtual subject to obtain the face data of the virtual character, where the face data include expression data and/or eye expression data.

In another possible embodiment, redirecting the motion data of the virtual subject to obtain the motion data of the virtual character includes acquiring a first correspondence between skeleton data of the virtual subject and skeleton data of the virtual character, where the skeleton data is used for instructing topological features of skeletons; and redirecting the motion data of the virtual subject to the virtual character according to the first correspondence to obtain the motion data of the virtual character.

In another possible embodiment, redirecting the face data of the virtual subject to obtain the face data of the virtual character includes acquiring a second correspondence between the face data of the virtual subject and the face data of the virtual character, where the face data is used for instructing facial structure features and emotional style features; and redirecting the face data of the virtual subject to the virtual character according to the second correspondence to obtain the face data of the virtual character.

In another possible embodiment, after determining the target feature data of the virtual character according to the real feature data, the method also includes driving and displaying a skinned mesh motion of the virtual character according to the motion data of the virtual character and a binding relationship between skeletons of the virtual character and skinned mesh.

In another possible embodiment, before generating an animation of the virtual character according to the target feature data, the method also includes acquiring video recording data carrying a time code, where the video recording data include video data obtained by recording performance content of the real subject.

In another possible embodiment, the method also includes acquiring prop motion data of a real prop used by the real subject during the performance; and determining, according to the real prop data, prop motion data of a virtual prop used by the virtual character.

Moreover, determining the video stream pushing data corresponding to the virtual character according to the target feature data includes determining the video stream pushing data corresponding to the virtual character according to the target feature data and the prop motion data of the virtual prop.

According to another aspect of the present disclosure, a virtual livestreaming apparatus is provided. The apparatus includes an acquisition module, a first determination module, a second determination module, and a sending module.

The acquisition module is configured to acquire real feature data of a real subject. The real feature data include motion data and face data of the real subject during a performance.

The first determination module is configured to determine target feature data of a virtual character according to the real feature data. The virtual character is a preset animation model. The target feature data include motion data and face data of the virtual character.

The second determination module is configured to determine video stream pushing data corresponding to the virtual character according to the target feature data.

The sending module is configured to send the video stream pushing data corresponding to the virtual character to a target livestreaming platform. The video stream pushing data is used for instructing the target livestreaming platform to display virtual livestreaming of the virtual character.

In a possible embodiment, the second determination module is also configured to determine the video stream pushing data corresponding to the virtual character according to the target feature data and preset motion data when a first trigger instruction is received. The preset motion data is used for instructing a preset skeletal motion of the virtual character.

In another possible embodiment, the second determination module is also configured to determine the video stream pushing data corresponding to the virtual character according to the target feature data and preset special effect data when a second trigger instruction is received. The preset special effect data is used for instructing a preset virtual special effect of the virtual character.

According to another aspect of the present disclosure, a computer device is provided. The computer device includes a processor and a memory configured to store a processor-executable instruction.

The processor is configured to acquire real feature data of a real subject, where the real feature data comprise motion data and face data of the real subject during a performance; determine target feature data of a virtual character according to the real feature data, where the virtual character is a preset animation model, and the target feature data include motion data and face data of the virtual character; determine video stream pushing data corresponding to the virtual character according to the target feature data; and send the video stream pushing data corresponding to the virtual character to a target livestreaming platform, where the video stream pushing data is used for instructing the target livestreaming platform to display virtual livestreaming of the virtual character.

According to another aspect of the present disclosure, a virtual livestreaming system is provided. The virtual livestreaming system includes a motion capture garment, a first camera, a helmet, and a computer device.

The motion capture garment is provided with a plurality of optical mark points.

The first camera is configured to capture motion data of a real subject during a performance.

A second camera is disposed on the helmet. The second camera is configured to capture face data of the real subject during the performance.

The computer device is configured to execute the preceding method.

According to another aspect of the present disclosure, a non-transitory computer-readable storage medium is provided. The non-transitory computer-readable storage medium stores a computer program instruction. The computer program instruction, when executed by a processor, implements the preceding method.

According to embodiments of the present disclosure, real feature data of a real subject are acquired. The real feature data include motion data and face data of the real subject during a performance. Target feature data of a virtual character is determined according to the real feature data. The virtual character is a preset animation model. The target feature data include motion data and face data of the virtual character. Video stream pushing data corresponding to the virtual character are determined according to the target feature data. The video stream pushing data corresponding to the virtual character are sent to a target livestreaming platform. The video stream pushing data is used for instructing the target livestreaming platform to display virtual livestreaming of the virtual character. That is, the performance of the real subject is used to generate the video stream pushing data corresponding to the virtual character. Then, the video stream pushing data are sent to the target livestreaming platform. In one aspect, the situation of manually drawing virtual animation is avoided, and the efficiency of virtual livestreaming is improved. In another aspect, the refined performance of the real subject can be directly migrated to the virtual character so that the skeletal motions and facial emotions of the virtual character are more realistic and vivid, ensuring the display effect of virtual livestreaming.

BRIEF DESCRIPTION OF DRAWINGS

The drawings, which are incorporated in and constitute a part of the specification, together with the specification, illustrate example embodiments, features, and aspects of the disclosure and serve to explain the principles of the disclosure.

DETAILED DESCRIPTION

Figure 1:
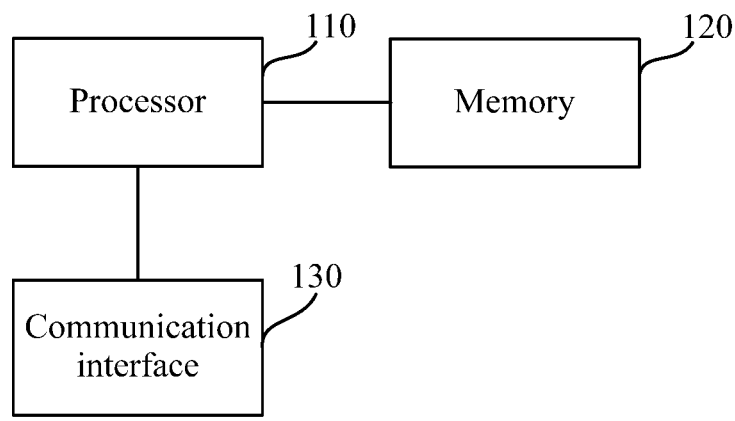
FIG. 1 is a diagram illustrating the structure of a computer device according to an example embodiment of the present disclosure.

Various example embodiments, features, and aspects of the present disclosure are described in detail below with reference to the drawings. Same reference numerals in the drawings denote elements having the same or similar functions. Although various aspects of the embodiments are shown in the drawings, the drawings are not necessarily drawn to scale unless otherwise indicated.

The word "example" as used herein means "serving as an example, an embodiment, or illustration". Any embodiment described herein as "example" is not necessarily to be explained as superior to or better than other embodiments.

In addition, numerous specific details are given in the following embodiments to better describe the present disclosure. It is to be understood by those skilled in the art that the present disclosure can be practiced without certain specific details. In some embodiments, methods, manners, elements, and circuits well known to those skilled in the art have not been described in detail to highlight the spirit of the present disclosure.

Referring to FIG. 1, FIG. 1 is a diagram illustrating the structure of a computer device according to an example embodiment of the present disclosure.

A virtual livestreaming method in this embodiment of the present disclosure may be executed by a computer device.

The computer device may be a processing system including multiple devices or systems. For example, the computer device is a server, a server cluster consisting of several servers, or a cloud computing service center. This is not limited in this embodiment of the present disclosure. For ease of description, only the example that a server is taken as a computer device is introduced. As shown in FIG. 1, the computer device includes a processor 110, a memory 120, and a communication interface 130. It is to be understood by those skilled in the art that the structure illustrated in FIG. 1 does not limit the computer device. The computer device may include more or fewer components than those illustrated or may be configured by combining certain components or using different components.

The processor 110 is a control center of the computer device, connects various parts of the entire computer device by using various interfaces and lines, and executes the various functions of the computer device and data processing by running or executing software programs and/or modules stored in the memory 120 and invoking data stored in the memory 120, thereby controlling the computer device integrally. The processor 110 may be implemented by a CPU or a graphics processing unit (GPU).

The memory 120 may be used for storing software programs and modules. The processor 110 executes various function applications and data processing by running the software programs and modules stored in the memory 120. The memory 120 may include a program storage region and a data storage region. The program storage region may store an operating system, a virtual module, and an application program (such as neural network model training) required by at least one function. The data storage region may store data created according to use of the computer device. The memory 120 may be implemented by any type of transitory or non-transitory storage device or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc. Accordingly, the memory 120 may also include a memory controller to provide access to the memory 120 by the processor 110.

The processor 110 is configured to execute the following functions: acquiring real feature data of a real subject, where the real feature data include motion data and face data of the real subject during a performance; determining target feature data of a virtual character according to the real feature data, where the virtual character is a preset animation model, and the target feature data include motion data and face data of the virtual character; determining video stream pushing data corresponding to the virtual character according to the target feature data; and sending the video stream pushing data corresponding to the virtual character to a target livestreaming platform, where the video stream pushing data is used for instructing the target livestreaming platform to display virtual livestreaming of the virtual character.

The virtual livestreaming method provided in this embodiment of the present disclosure relates to the technical field of livestreaming, and optionally, is applied to the field of virtual image livestreaming. Technically, the virtual livestreaming method mainly relates to the technical field of computer vision and computer graphics, and optionally, relates to technologies of motion capture, expression capture, eye expression capture, motion redirection, expression migration, and engine real-time rendering. The virtual livestreaming technology is based on performance animation technology. The performance animation technology includes an animation production technology for capturing skeletal motions and facial emotions of a real subject to generate an animation video of a virtual character in real time. For example, the animation video is a three-dimensional animation video. This is not limited in this embodiment of the present disclosure.

Hereinafter, the virtual livestreaming method provided in this embodiment of the present disclosure is introduced by using several example embodiments.

Figure 2:
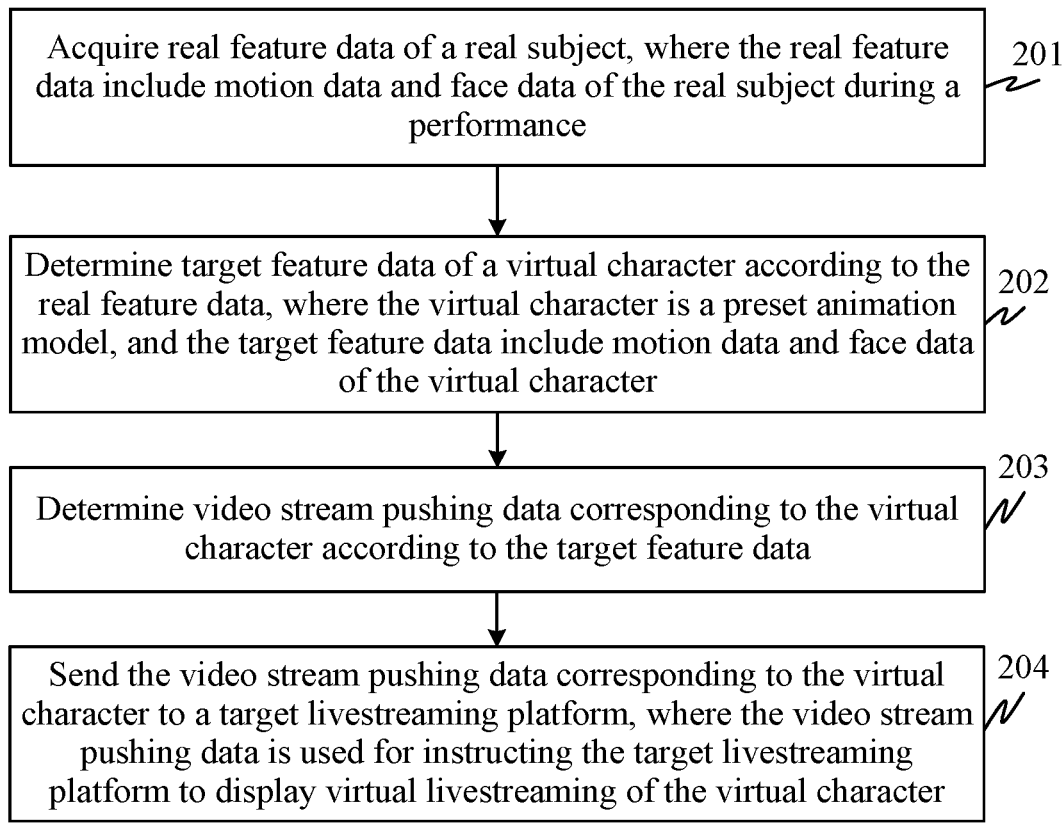
FIG. 2 is a flowchart of a virtual livestreaming method according to an example embodiment of the present disclosure.

Referring to FIG. 2, FIG. 2 is a flowchart of a virtual livestreaming method according to an example embodiment of the present disclosure. This embodiment is illustrated through the application of the method to the computer device shown in FIG. 1. The method includes the following steps.

In step 201, real feature data of a real subject are acquired. The real feature data include motion data and face data of the real subject during a performance.

During the performance of the real subject, the computer device captures a skeletal motion of the real subject through an optical capture device to obtain the motion data of the real subject. Meanwhile, a facial emotion of the real subject is captured through the optical capture device to obtain the face data of the real subject.

Optionally, the optical capture device includes at least one of an infrared camera, an RGB camera, or a depth camera. The type of the optical capture device is not limited in this embodiment of the present disclosure.

The real subject is a movable subject in a real environment. For example, the real subject is a person. This is not limited in this embodiment of the present disclosure. In the following, only the example that a person is taken as the real subject is illustrated.

The real feature data include the motion data and face data of the real subject during a performance. The motion data is used for instructing a skeletal motion of the real subject. The face data is used for instructing a facial emotion of the real subject.

The motion data of the real subject include limb motion data and/or gesture motion data. The limb motion data is used for instructing a limb motion of the real subject. The gesture motion data is used for instructing a hand motion of the real subject.

It is to be noted that limbs in this embodiment of the present disclosure are parts of the body excluding hands. That is, the body of the real subject includes the limbs of the real subject and the hands other than the limbs.

The face data of the real subject include expression data and/or eye expression data. The expression data is used for instructing facial expression of the real subject. The eye expression data is used for instructing the eyeball state of the real subject.

In step 202, target feature data of a virtual character is determined according to the real feature data. The virtual character is a preset animation model. The target feature data include motion data and face data of the virtual character.

The computer device converts the real feature data of the real subject into the target feature data of the virtual character.

Optionally, the virtual character is a preset three-dimensional or two-dimensional animation model. The virtual character is a movable subject in a virtual environment. Optionally, the virtual character is a virtual person, a virtual animal, a virtual pet, or another subject of a virtual form.

The target feature data of the virtual character include the motion data and face data of the virtual character. The motion data of the virtual character include limb motion data and/or gesture motion data. The face data of the virtual character include expression data and/or eye expression data.

The target feature data correspond to the real feature data. The meaning of the target feature data may be analogous to the related description of the real feature data. Details are not described herein.

It is to be noted that the computer device may acquire the face data of the real subject in units of frames. Subsequently, the face data of the virtual character determined according to the real feature data can also be correspondingly converted in units of frames. This is not limited in this embodiment of the present disclosure.

In step 203, video stream pushing data corresponding to the virtual character are determined according to the target feature data.

The computer device generates the video stream pushing data corresponding to the virtual character in real time according to the target feature data of the virtual character.

The computer device synthesizes and renders the target feature data of the virtual character to generate the video stream pushing data corresponding to the virtual character in real time.

Optionally, the video stream pushing data are stream pushing data of virtual livestreaming of the virtual character. The video stream pushing data is used for instructing a target livestreaming platform to display virtual livestreaming of the virtual character.

The video stream pushing data are generated according to the target feature data of the virtual character. Optionally, the computer device generates the performance content of the virtual character according to the target feature data of the virtual character and generates the video stream pushing data corresponding to the virtual character according to the performance content of the virtual character.

In step 204, the video stream pushing data corresponding to the virtual character are sent to a target livestreaming platform. The video stream pushing data is used for instructing the target livestreaming platform to display virtual livestreaming of the virtual character.

The computer device sends the video stream pushing data corresponding to the virtual character to the target livestreaming platform. The target livestreaming platform is used for displaying the virtual livestreaming of the virtual character. The target livestreaming platform is one or more livestreaming platforms.

The target livestreaming platform is used for displaying an animation video of a virtual character, that is, virtual livestreaming, in a virtual environment. The animation video of the virtual character includes a three-dimensional or two-dimensional animation video. In the following, for ease of description, only the example that the animation video of the virtual character is a three-dimensional animation video is illustrated.

Exemplarily, the virtual environment is a three-dimensional virtual environment. The virtual environment is a scenario created for the virtual character to carry out activities. The virtual environment may be a simulation environment of the real world, a semi-simulation and semi-fiction environment, or a purely fictional environment. This is not limited in this embodiment of the present disclosure.

In an illustrative example, the real subject is a person, such as an actor. According to a preset script and storyboard requirements, the actor performs the performances required by a character in a plot, including limb motions, gesture motions, expression, and eye expression, according to the direction of a director. A corresponding capture device captures the limb motions, gesture motions, expression, and eye expression of the actor. The computer device obtains the real feature data of the actor and converts the real feature data of the actor into the target feature data of a virtual person. That is, the limb motions and gesture motions of the actor are transferred to the virtual person. The expression and eye expression of the actor are transferred to the face of the virtual person. The video stream pushing data corresponding to the virtual person are generated in real time based on the target feature data and are pushed to a target livestreaming platform.

Because of the limitations of an inertial capture device in the related art when the inertial capture device captures motions, the accuracy is not high. In addition, motion drift occurs during long time livestreaming, which seriously affects the accuracy. For the manner of premade expression control, the number of expression is relatively limited at present, and the transition between expression and expression is unnatural. Such a scheme is only suitable for low-quality livestreaming applications. To this end, according to the virtual livestreaming method provided in this embodiment of the present disclosure, the real feature data of the real subject are acquired. The real feature data include the motion data and face data of the real subject during a performance. The real feature data are converted into the target feature data of the virtual character. The target feature data include the motion data and face data of the virtual character. The video stream pushing data corresponding to the virtual character are determined according to the target feature data. The video stream pushing data corresponding to the virtual character are sent to the target livestreaming platform. The video stream pushing data is used for instructing the target livestreaming platform to display the virtual livestreaming of the virtual character. That is, the performance of the real subject is used to generate the video stream pushing data corresponding to the virtual character. Then, the video stream pushing data are sent to the target livestreaming platform. In one aspect, the situation of manually drawing virtual animation is avoided, and the efficiency of virtual livestreaming is improved. In another aspect, the refined performance of the real subject can be directly migrated to the virtual character so that the skeletal motions and facial emotions of the virtual character are more realistic and vivid, ensuring the display effect of virtual livestreaming.

According to the virtual livestreaming method provided in this embodiment of the present disclosure, the real feature data of the real subject are obtained through capturing the skeletal motions and facial emotions of the real subject by the optical capture device during the performance of the real subject. Thus, the error and offset caused by capturing the motions by the inertial capture device are avoided. In terms of quality, the real-time high-precision and high-quality motion driving and expression driving effects can be obtained. In terms of stability, long-time stable livestreaming can be supported depending on motion capture and expression capture technologies, further ensuring the display effect of virtual livestreaming.

Since the current virtual livestreaming lacks a fusion scheme with premade animation, the virtual livestreaming can only rely on the performance of the real subject and cannot implement some motions that the real subject cannot perform on the spot, lacking richness. Therefore, in the case of real-time virtual livestreaming, preset motion data can be imported into the computer device, and triggered and synthesized when a trigger instruction is received. Thus, the motion data of the virtual character are fused with the preset motion data. The virtual character can implement some motions that the real subject cannot perform on the spot so that a better livestreaming display effect can be achieved subsequently. In addition, to make the display content of the real-time virtual livestreaming richer, preset special effect data may be imported into the computer device and synthesized when a trigger instruction is received.

Therefore, the computer device determines the video stream pushing data corresponding to the virtual character according to the target feature data and preset fusion data. The preset fusion data is used for instructing preset skeletal motions and/or preset virtual special effects.

Optionally, the preset fusion data include preset motion data and/or preset special effect data. The preset motion data is used for instructing a preset skeletal motion of the virtual character. The preset special effect data is used for instructing a preset virtual special effect of the virtual character. Exemplarily, the preset fusion data carry a specified time code. The specified time code is used for instructing a time point at which the preset fusion data are added when an animation picture is synthesized.

Figure 3:
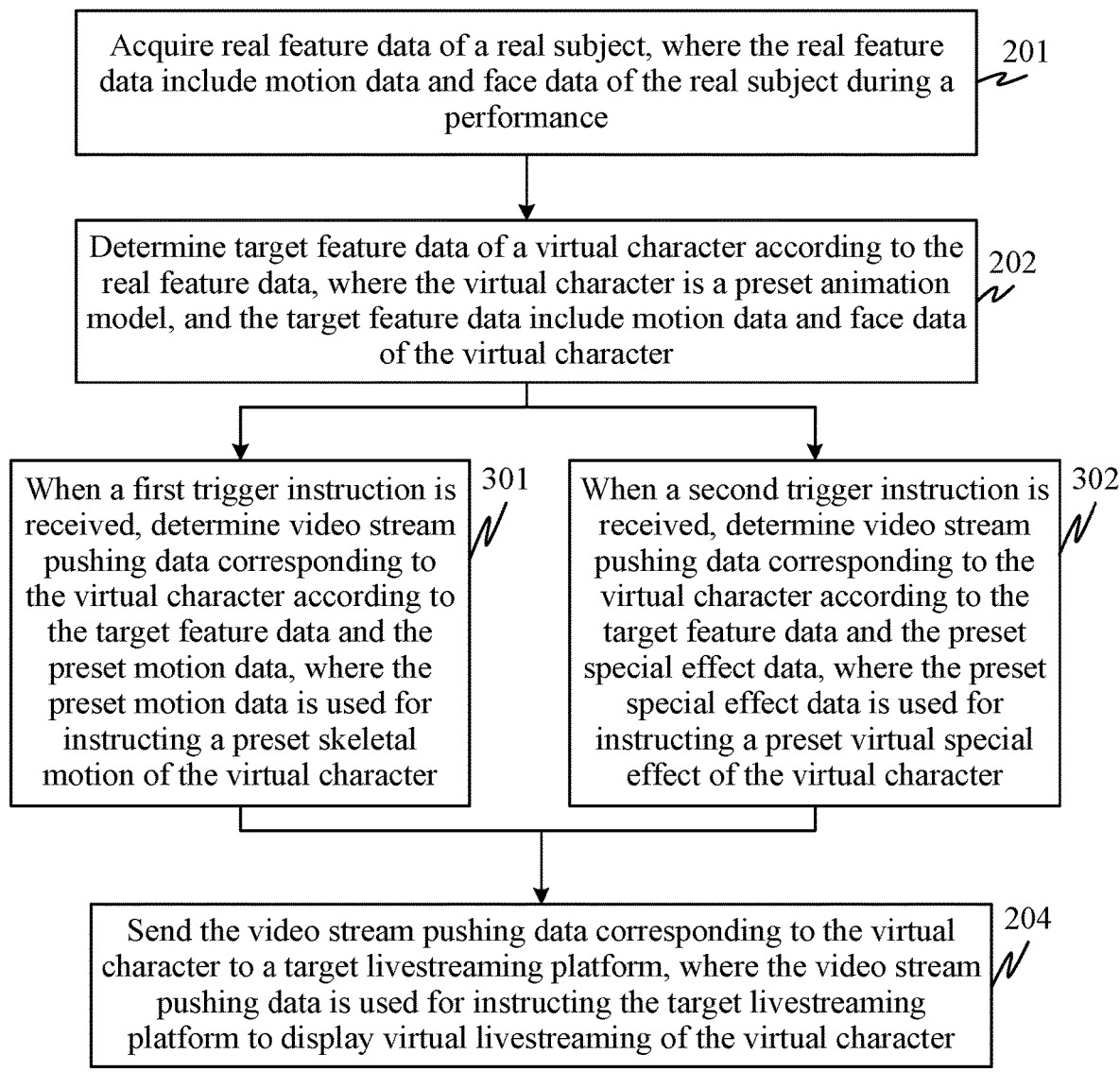
FIG. 3 is a flowchart of another virtual livestreaming method according to an example embodiment of the present disclosure.

In a possible embodiment, based on the embodiment provided in FIG. 2, the preceding step 203 may be implemented as the following steps instead, as shown in FIG. 3.

In step 301, when a first trigger instruction is received, the computer device determines video stream pushing data corresponding to the virtual character according to the target feature data and the preset motion data. The preset motion data is used for instructing a preset skeletal motion of the virtual character.

Optionally, the first trigger instruction is a user operation signal that triggers the addition of the preset motion data. Exemplarily, a trigger instruction includes any one or a combination of a click operation instruction, a slide operation instruction, a press operation instruction, or a long press operation instruction.

In other possible embodiments, the trigger instruction may also be implemented in the form of event triggering or voice triggering. For example, the computer device receives a voice signal input by a user, parses the voice signal to obtain voice content, and determines to receive a trigger instruction when a key word matching with preset trigger information exists in the voice content. This is not limited in this embodiment of the present disclosure.

An actor cannot perform a certain motion on the spot. For example, the actor does not know how to perform a certain motion or is not professional enough. Alternatively, a high-difficulty and dangerous motion cannot be immediately implemented on the spot during actual livestreaming. Alternatively, a motion that is not suitable for doing now, such as rolling on the ground, may affect the capture of the motion. In an illustrative example, the virtual character has a dance motion in a virtual livestreaming process. The dance level of the actor is limited, so the dance motion cannot be performed well. Therefore, the dance motion is captured in advance. The dance motion of the virtual character is generated according to the dance motion. The dance motion of the virtual character is put into a preset motion library as the preset motion data. In an actual virtual livestreaming process, when the virtual character needs to dance, the preset motion data in a premade motion library are invoked through the first trigger instruction. Thus, the dance motion of the virtual character is subsequently presented on a target livestreaming platform.

In step 302, when a second trigger instruction is received, the computer device determines video stream pushing data corresponding to the virtual character according to the target feature data and the preset special effect data. The preset special effect data is used for instructing a preset virtual special effect of the virtual character.

The second trigger instruction is a user operation signal that triggers the addition of the preset special effect data. The second trigger instruction is different from the first trigger instruction. The implementation form of the second trigger instruction may be analogous to the implementation form of the first trigger instruction. The implementation form of the second trigger instruction is not limited in this embodiment of the present disclosure.

Optionally, preset virtual special effects include special effects such as wind, rain, thunder and lightning, fireworks, and fragmentation. This is not limited in this embodiment of the present disclosure.

It is to be noted that step 301 and step 302 may be performed either or both. Moreover, the execution order of step 301 and step 302 is not limited in this embodiment of the present disclosure.

An embodiment of the present disclosure provides a virtual livestreaming system. The virtual livestreaming system includes a motion capture garment, a first camera, and a helmet. The motion capture garment is provided with multiple optical mark points. The first camera is configured to capture motion data of a real subject during a performance. A second camera is disposed on the helmet. The second camera is configured to capture face data of the real subject during the performance. The first camera and the second camera are established a communication connection with a computer device, respectively. The computer device is configured to execute the virtual livestreaming method provided in the embodiments of the present disclosure. At least two first cameras are disposed to capture the motion data of the real subject during the performance. Multiple first cameras may be disposed according to actual conditions. At least one second camera is disposed to capture the face data of the real subject during the performance. Multiple second cameras may be disposed according to actual situations.

Figure 4:
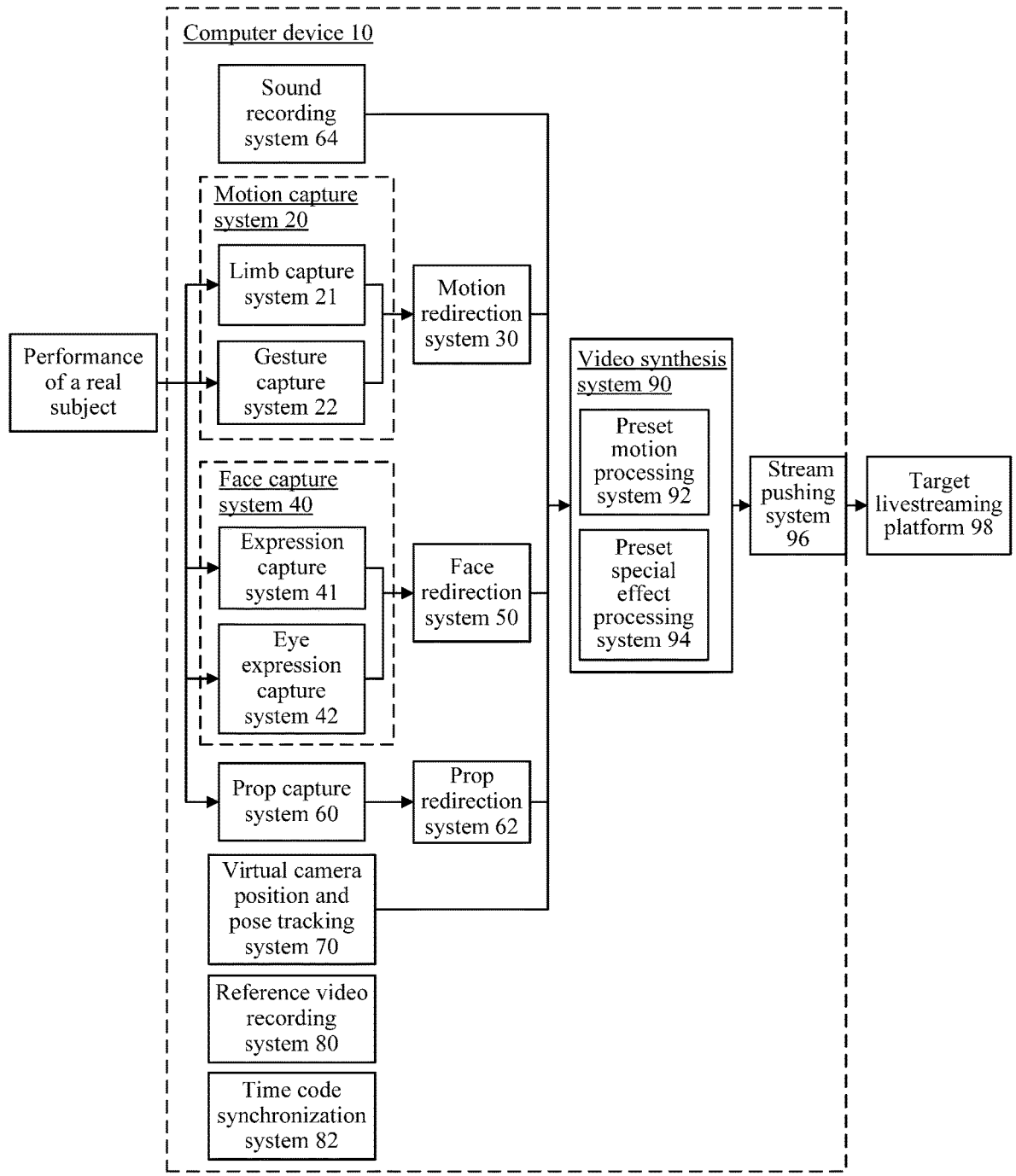
FIG. 4 is a diagram illustrating the structure of another computer device according to an example embodiment of the present disclosure.

Referring to FIG. 4, FIG. 4 is a diagram illustrating the structure of another computer device according to an example embodiment of the present disclosure.

A computer device 10 includes a motion capture system 20, a motion redirection system 30, a face capture system 40, a face redirection system 50, a prop capture system 60, a prop redirection system 62, a sound recording system 64, a virtual camera position and pose tracking system 70, a reference video recording system 80, a time code synchronization system 82, a video synthesis system 90, and a stream pushing system 96.

The motion capture system 20 includes a limb capture system 21 and a gesture capture system 22. The limb capture system 21 and the gesture capture system 22 are connected to the motion redirection system 30, respectively.

The limb capture system 21 is configured to acquire position data corresponding to each of multiple optical mark points preset on a limb of the real subject, and determine limb motion data of the real subject according to the position data corresponding to the each of the multiple optical mark points; and perform limb reconstruction according to the limb motion data of the real subject to obtain limb motion data of a virtual subject.

The virtual subject is a virtual model obtained by restoring and reconstructing the real subject.

The gesture capture system 22 is configured to acquire position data corresponding to each of multiple optical mark points preset on a hand of the real subject, and determine gesture motion data of the real subject according to the position data corresponding to the each of the multiple optical mark points; and perform hand reconstruction according to the gesture motion data of the real subject to obtain gesture motion data of the virtual subject.

Optionally, the limb capture system 21 is used for limb capture through a first camera. The gesture capture system 22 is used for gesture capture through the first camera. Exemplarily, the first camera is an infrared camera.

The motion redirection system 30 is configured to redirect motion data of the virtual subject to obtain motion data of a virtual character. The motion data include limb motion data and/or gesture motion data.

The face capture system 40 includes an expression capture system 41 and an eye expression capture system 42. The expression capture system 41 and the eye expression capture system 42 are connected to the face redirection system 50, respectively.

The expression capture system 41 is configured to acquire face video frames of the real subject, where the face video frames are video frames including the face of the real subject, and the face video frames are used for instructing face data of the real subject; and performing face reconstruction according to the face data of the real subject to obtain face data of the virtual subject.

Optionally, the expression capture system 41 is configured to acquire the face video frames of the real subject through the second camera on the helmet of the real subject. For example, the second camera is a head-mounted RGB or RGBD camera.

The face redirection system 50 is configured to redirect the face data of the virtual subject to obtain the face data of the virtual character. In this embodiment of the present disclosure, the redirection processing in a face redirection process is also referred to as expression migration processing.

It is to be noted that the motion data in this embodiment of the present disclosure include limb motion data and/or gesture motion data. The face data include expression data and/or eye expression data. That is, the motion data of the real subject include limb motion data and/or gesture motion data of the real subject. The face data of the real subject include expression data and/or eye expression data of the real subject. The motion data of the virtual subject include limb motion data and/or gesture motion data of the virtual subject. The face data of the virtual subject include expression data and/or eye expression data of the virtual subject. The motion data of the virtual character include limb motion data and/or gesture motion data of the virtual character. The face data of the virtual character include expression data and/or eye expression data of the virtual character. The motion redirection system 30, the face redirection system 50, the sound recording system 64, and the virtual camera position and pose tracking system 70 are connected to the video synthesis system 90, respectively.

The motion redirection system 30 is also configured to input the redirected motion data of the virtual character into the video synthesis system 90.

The face redirection system 50 is also configured to input the redirected face data of the virtual character into the video synthesis system 90.

The prop capture system 60 is connected to the prop redirection system 62. The prop capture system 60 is configured to acquire prop motion data of a real prop used by the real subject during the performance.

The prop capture system 60 is configured to capture the motion of the used real prop during the performance of the real subject to obtain prop motion data of the real prop. The prop motion data of the real prop are used for instructing the motion of the real prop. The real prop may be a soccer ball, a basketball, a knife, a sword, a staircase, or the like. The type of the real prop is not limited in this embodiment of the present disclosure.

Optionally, the prop capture system 60 is used for prop capture through the first camera. Exemplarily, the first camera is an infrared camera.

Optionally, the prop capture system 60 is configured to acquire position data corresponding to an optical mark point preset on a real prop, and determine prop motion data of the real prop according to the position data corresponding to the optical mark point; and perform prop reconstruction according to the prop motion data of the real prop to obtain prop motion data of a virtual intermediate prop.

The virtual intermediate prop is a virtual model obtained by restoring and reconstructing the real prop.

The prop redirection system 62 is configured to redirect the prop motion data of the virtual intermediate prop to obtain prop motion data of a virtual prop used by the virtual character. The prop motion data of the virtual prop is used for instructing the motion of the virtual prop.

The prop redirection system 62 is also configured to input the redirected prop motion data of the virtual prop into the video synthesis system 90.

The sound recording system 64 is configured to record the sound of the real subject during the performance to obtain sound recording data, and input the sound recording data into the video synthesis system 90.

The virtual camera position and pose tracking system 70 is configured to capture a virtual camera to obtain virtual camera position and pose data, and input the virtual camera position and pose data into the video synthesis system 90. The virtual camera position and pose data is used for instructing a preview camera viewing angle of a to-be-generated animation picture. The virtual camera position and pose data include the position of the virtual camera, the direction of the virtual camera, and parameters of the virtual camera. For example, the parameters of the virtual camera include focal length.

The reference video recording system 80 is configured to shoot the performance content of the real subject to obtain video recording data. The video recording data may serve as reference data for video stream pushing data. That is, the video recording data are reference data of the video synthesis system 90.

Optionally, limb capture and gesture capture, expression capture and eye expression capture, sound recording, reference video recording, and prop capture in this embodiment of the present disclosure are performed simultaneously. However, limb capture and gesture capture, expression capture and eye expression capture, sound recording, reference video recording, and prop capture are implemented through different systems. Because of the delay in communication, different signals may be out of sync. The finally generated animation needs complete synchronization of the preceding systems. Therefore, the time code synchronization system 82 is added to the entire computer device 10. The systems in the computer device 10 synchronize based on the same time code.

The video synthesis system 90 is also referred to as a render engine. The video synthesis system 90 is configured to synchronize multiple imported data (including limb motion data, gesture motion data, expression data, eye expression data, sound recording data, virtual camera position and pose data, and prop motion data of a virtual prop) according to a time code. After synchronization, the multiple imported data are synthesized and rendered to obtain video stream pushing data.

The video synthesis system 90 includes a preset motion processing system 92 and a preset special effect processing system 94.

The preset motion processing system 92 is configured to store preset motion data in a preset motion library. The preset motion data is used for instructing a preset skeletal motion of the virtual character. The stored preset motion data are invoked when a first trigger instruction is received during virtual livestreaming. According to target feature data and the preset motion data, video stream pushing data corresponding to the virtual character are determined.

The trigger form of the first trigger instruction may include any one or a combination of human trigger, event trigger, voice trigger, button trigger, or action trigger. This is not limited in this embodiment of the present disclosure.

The preset special effect processing system 94 is configured to store preset special effect data.

The preset special effect data is used for instructing a preset virtual special effect of the virtual character. The stored preset special effect data are invoked when a second trigger instruction is received during virtual livestreaming. According to target feature data and the preset special effect data, video stream pushing data corresponding to the virtual character are determined. Optionally, the second trigger instruction is different from the first trigger instruction.

Optionally, the video synthesis system 90 stores preset materials. The preset materials include at least one of lighting, a hair material, a scenario material, a scenario texture, or a scenario map. The video synthesis system 90 is configured to directly invoke the stored preset materials during virtual livestreaming. During virtual livestreaming, if a material such as a scenario is manufactured in real time, the real-time of the livestreaming is delayed. Therefore, to ensure the real-time and stability of the virtual livestreaming, materials are manufactured in advance. The materials are directly invoked during the virtual livestreaming.

The video synthesis system 90 is connected to the stream pushing system 96. The stream pushing system 96 is connected to a target livestreaming platform 98. The video synthesis system 90 is also configured to send the rendered video stream pushing data to the target livestreaming platform 98 through the stream pushing system 96. The target livestreaming platform 98 is configured to display virtual livestreaming of the virtual character.

It is to be noted that the implementation details of the steps involved in each of the preceding systems can be referred to the related description in the following embodiments, which are not introduced herein.

Another point to be noted is that the systems provided in the preceding embodiment, when implementing functions of the systems, are exemplified merely by the division of the preceding systems. In practical application, the preceding functions can be allocated to different systems according to actual needs to complete part or all of the preceding functions. For example, a limb motion capture system and a gesture motion capture system may be combined into one system, that is, a motion capture system. An expression capture system and an eye expression capture system may be combined into one system, that is, a face capture system. A motion capture system and a motion redirection system may be combined into one system, that is, a motion processing system. A face capture system and a face redirection system may be combined into one system, that is, a face processing system. A prop capture system and a prop redirection system may be combined into one system, that is, a prop processing system. All of the preceding systems may also be combined into one system. This is not limited in this embodiment of the present disclosure.

Figure 5:
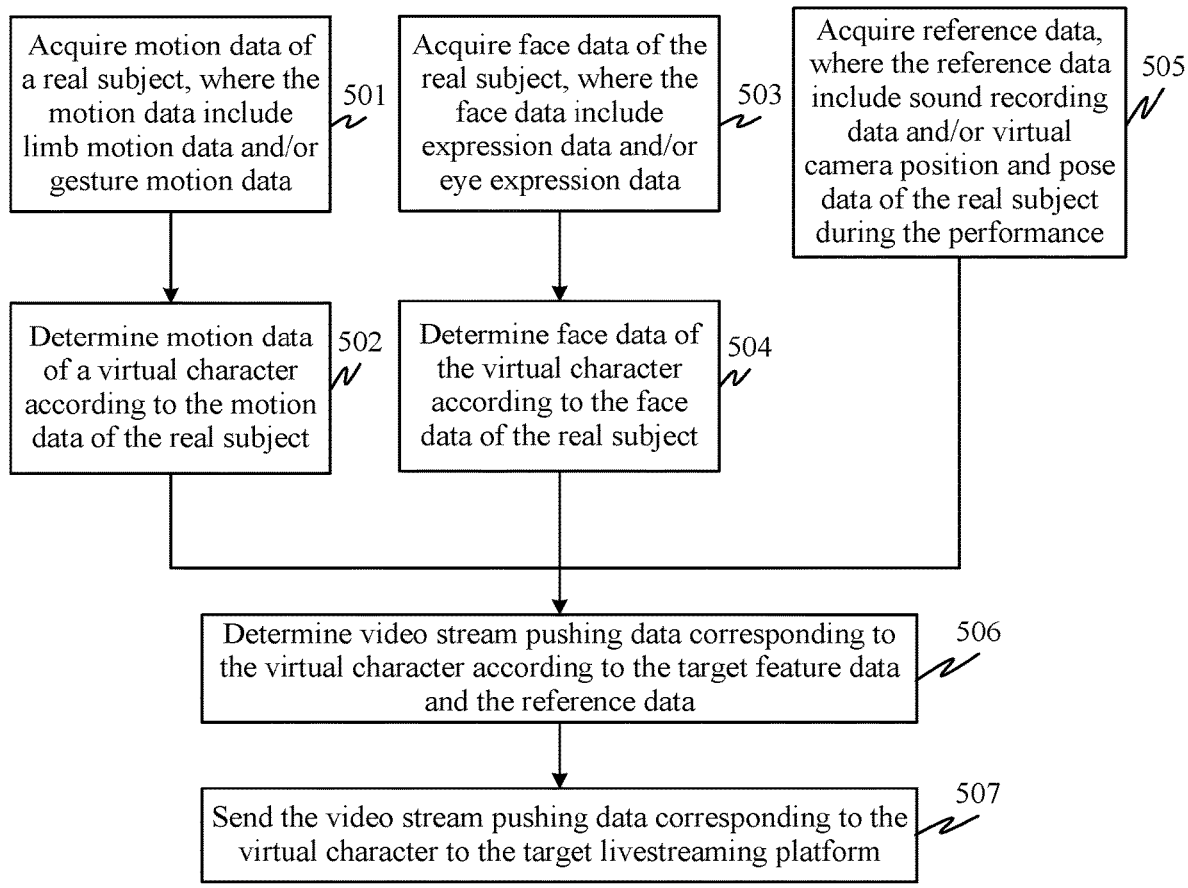
FIG. 5 is a flowchart of another virtual livestreaming method according to an example embodiment of the present disclosure.

Referring to FIG. 5, FIG. 5 is a flowchart of another virtual livestreaming method according to an example embodiment of the present disclosure. This embodiment is illustrated through the application of the method to the computer device shown in FIG. 4. The method includes the following steps.

In step 501, motion data of a real subject are acquired. The motion data include limb motion data and/or gesture motion data.

During the performance of the real subject, a motion capture system acquires the motion data of the real subject. The motion data include limb motion data and/or gesture motion data.

For example, the real subject is a person (such as an actor). Motion capture records motion data of the actor. Motion capture is collected by an apparatus worn or attached to the actor. For example, the actor wears a suit of clothes with camera tracking marks or clothes with built-in sensors. A motion capture process is completed through the reflection of the camera tracking marks or the movement of the sensors.

In a possible embodiment, position data corresponding to each of multiple optical mark points preset on a limb of the real subject are acquired. Limb motion data of the real subject are determined according to the position data corresponding to the each of the multiple optical mark points. Moreover/alternatively, position data corresponding to each of multiple optical mark points preset on a hand of the real subject are acquired. Gesture motion data of the real subject are determined according to the position data corresponding to the each of the multiple optical mark points.

Optionally, the real subject wears a motion capture garment provided with multiple optical mark points. The motion capture garment covers limbs and hands of the real subject. Exemplarily, the motion capture garment includes a garment covering on the limbs of the real subject and gloves covering on the hands of the real subject.

Optionally, multiple optical mark points preset on the garment of the real subject correspond to multiple joint points of the limbs of the real subject in a one-to-one manner. Multiple optical mark points preset on the gloves of the real subject correspond to multiple joint points of the hands of the real subject in a one-to-one manner.

The motion capture system acquires the motion data of the real subject through a first optical capture device. Exemplarily, the first optical capture device is an infrared camera. The motion capture system captures positions of multiple reflection points (including multiple optical mark points) on the real subject through the infrared camera, and calculates the figure of the real subject in real time and tracks the motion of the real subject. That is, the motion capture system determines the figure of the real subject and the motion data of the real subject according to the positions of the multiple reflection points. The motion data include limb motion data and gesture motion data.

Optionally, the limb motion data is used for instructing a limb motion of the real subject. The limb motion data include three-dimensional position coordinates and motion parameters of joint points on the limbs of the real subject. Exemplarily, a joint point is a key joint point at a preset position, such as head, neck, shoulder, arm, or leg.

The gesture motion data is used for instructing a hand motion of the real subject. The gesture motion data include three-dimensional position coordinates and motion parameters of joint points on the hands of the real subject.

In step 502, motion data of a virtual character are determined according to the motion data of the real subject.

The motion capture system converts the motion data of the real subject into motion data of a virtual subject. A motion redirection system redirects the motion data of the virtual subject to obtain the motion data of the virtual character.

The virtual subject is a virtual model obtained by restoring and reconstructing the real subject. Optionally, the virtual subject is a virtual model obtained by restoring and reconstructing the real subject and is in the same size as the real subject.

Optionally, the virtual subject is a three-dimensional or two-dimensional virtual model. In the following, only the example that the virtual subject is a three-dimensional virtual model is illustrated. There is a mapping relationship between the motion data of the virtual subject and the motion data of the real subject. The meaning of the motion data of the virtual subject may be analogous to the related description of the motion data of the real subject. Details are not described herein.

In a possible embodiment, the motion redirection system redirects the motion data of the virtual subject to obtain the motion data of the virtual character, including acquiring a first correspondence between skeleton data of the virtual subject and skeleton data of the virtual character, where the skeleton data is used for instructing topological features of skeletons; and redirecting the motion data of the virtual subject to the virtual character according to the first correspondence to obtain the motion data of the virtual character.

Before the motion data of the virtual subject are redirected to obtain the motion data of the virtual character, the first correspondence between the skeleton data of the virtual subject and the skeleton data of the virtual character is established. The skeleton data of the virtual subject are used for instructing topological features of skeletons of the virtual subject. The skeleton data of the virtual character are used for instructing topological features of skeletons of the virtual character.

The topological features of skeletons are used for instructing the distribution of the skeletons and the state of connection between the skeletons.

The motion redirection system redirects the motion data of the virtual subject to the virtual character according to the first correspondence to obtain the motion data of the virtual character, including redirecting limb motion data of the virtual subject to the virtual character according to the first correspondence to obtain limb motion data of the virtual character; and/or redirecting gesture motion data of the virtual subject to the virtual character to obtain gesture motion data of the virtual character.

Optionally, after the motion data of the virtual character are determined according to the motion data of the real subject, a skinned mesh motion of the virtual character is driven and displayed according to the motion data of the virtual character and a binding relationship between skeletons of the virtual character and skinned mesh. The binding relationship between skeletons of the virtual character and skinned mesh is preset.

In step 503, face data of the real subject are acquired. The face data include expression data and/or eye expression data.

In a possible embodiment, face video frames of the real subject are acquired. The face video frames are video frames including the face of the real subject. The face video frames are used for instructing the face data of the real subject.

Optionally, a face capture system acquires the face video frames of the real subject through a second optical capture device.

Optionally, the expression data of the real subject are used for instructing facial expression of the real subject. The expression data include the three-dimensional position coordinate and motion parameter of each feature point on the face of the real subject. The each feature point is a feature point on the contour of the face of the real subject or on facial features of the real subject.

Optionally, the eye expression data of the real subject are used for instructing the eyeball state of the real subject. The eye expression data include the three-dimensional position coordinate and motion parameter of each feature point on eyeballs of the real subject. The data structure of the expression data and eye expression data is not limited in this embodiment.

In step 504, face data of the virtual character are determined according to the face data of the real subject.

The face capture system converts the face data of the real subject into face data of the virtual subject. A face redirection system redirects the face data of the virtual subject to obtain the face data of the virtual character. The virtual subject is a virtual model obtained by restoring and reconstructing the real subject.

The face data of the virtual subject include expression data and/or eye expression data of the virtual character. There is a mapping relationship between the face data of the virtual subject and the face data of the real subject. The meaning of the face data of the virtual subject may be analogous to the related description of the face data of the real subject. Details are not described herein.

Optionally, the face capture system converts the face data of the real subject into face data of the virtual subject, including invoking a first preset face processing model by the face capture system according to the face data of the real subject to output a face model of the virtual subject. The face model is used for instructing the face data of the virtual subject.

Optionally, the face video frames of the real subject are video frames including the face of the real subject. The face video frames are data in a two-dimensional form. The face model of the virtual subject is used for instructing expression data and/or eye expression data of the virtual character. The face model consists of data in a three-dimensional form. The first preset face processing model is used for converting two-dimensional face video frames of the real subject into a three-dimensional face model of the virtual subject.

Optionally, the first preset face processing model is a pre-trained neural network model for representing the correlation between the face video frames of the real subject and the face model of the virtual subject.

Optionally, the first preset face processing model is a preset mathematical model. The first preset face processing model includes a model coefficient between the face video frames of the real subject and the face model of the virtual subject. The model coefficient may be a fixed value or a dynamically modified value.

Optionally, the face redirection system redirects the face data of the virtual subject to obtain the face data of the virtual character, including acquiring a second correspondence between the face data of the virtual subject and the face data of the virtual character, where the face data is used for instructing facial structure features and emotional style features; and redirecting the face data of the virtual subject to the virtual character according to the second correspondence to obtain the face data of the virtual character.

Before the face data of the virtual subject are redirected to obtain the face data of the virtual character, the second correspondence between the face data of the virtual subject and the face data of the virtual character is established. The face data of the virtual subject are used for instructing the facial structure features and emotional style features of the virtual subject. The face data of the virtual character are used for instructing the facial structure features and emotional style features of the virtual character.

The facial structure features are used for instructing the contour of the face and the distribution of facial features. The emotional style features are used for instructing emotions reflected by multiple feature points on the face, such as happiness, sadness, and helplessness.

Optionally, the face redirection system redirects the face data of the virtual subject to the virtual character according to the second correspondence to obtain the face data of the virtual character, including redirecting expression data of the virtual subject to the virtual character according to the second correspondence to obtain expression data of the virtual character; and/or redirecting eye expression data of the virtual subject to the virtual character to obtain eye expression data of the virtual character.

Optionally, the face redirection system redirects the face data of the virtual subject to obtain the face data of the virtual character, including invoking a second preset face processing model by the face redirection system according to the face data of the virtual subject to output the face data of the virtual character.

Optionally, the second preset face processing model is a pre-trained neural network model for representing the correlation between the face data of the virtual subject and the face data of the virtual character.

Optionally, the second preset face processing model is a preset mathematical model. The second preset face processing model includes a model coefficient between the face data of the virtual subject and the face data of the virtual character. The model coefficient may be a fixed value or a dynamically modified value.

It is to be noted that the redirection processing in a face redirection process is also referred to as expression migration processing. The specific implementation of the expression migration processing is not limited in this embodiment of the present disclosure. For example, the real subject is a person (such as an actor), and the second optical capture device is a head-mounted RGB camera. The face capture system captures expression and eye expression of the actor during a performance through the head-mounted RGB camera worn by the actor to obtain a video. The video includes multiple face video frames. Each face video frame is reconstructed to obtain a three-dimensional face model of the virtual subject. The three-dimensional face model of the virtual subject is redirected to obtain the face data of the virtual character.

For capturing the expression and eye expression of the actor during a performance, the following methods may be used for capturing. For a face tracing method, several mark points are marked on the face of an actor to capture the face and obtain face information. For a no trace on the face method, the face of an actor has no mark. An algorithm is used to directly extract information from the face of the actor to capture the face and obtain face information. In a face capture process, a single camera or multiple cameras may be used to capture the face. A single camera is portable and easy to wear and can also achieve the result of multiple cameras. The multiple cameras can implement capturing of the face data from multiple angles. For a capture device, an RGB camera and/or an RGBD camera may be employed.

In step 505, reference data are acquired. The reference data include sound recording data and/or virtual camera position and pose data of the real subject during the performance.

During the performance of the real subject, when the motion data and face data of the real subject are captured, a sound recording system records the sound of the real subject to obtain the sound recording data of the real subject. At the same time, a virtual camera position and pose tracking system captures the virtual camera to obtain the virtual camera position and pose data.

That is, during the performance of the real subject, a virtual camera is synchronously captured. The position, pose, and motion trajectory of the virtual camera are recorded to obtain the virtual camera position and pose data. The virtual camera position and pose data is used for instructing a preview camera viewing angle of a to-be-generated animation picture. The preview camera viewing angle is an angle at which a virtual character and/or other scenario information are observed by a virtual camera in a virtual environment. That is, the to-be-generated animation picture is an animation picture collected by observing the virtual character from the viewing angle of the virtual camera. The virtual camera position and pose data include the position of the virtual camera, the direction of the virtual camera, and parameters of the virtual camera. For example, the parameters of the virtual camera include focal length.

It is to be noted that the capture and redirection process of the motion data shown in step 501 and step 502, the capture and redirection process of the face data shown in step 503 and step 504, and the acquisition process of the reference data shown in step 505 may be executed in parallel, regardless of the sequence.

In step 506, video stream pushing data corresponding to the virtual character are determined according to the target feature data and the reference data.

A video synthesis system determines video stream pushing data corresponding to an animation video of the virtual character in real time according to the target feature data and the reference data. Optionally, the animation video of the virtual character includes a three-dimensional or two-dimensional animation video.

The video stream pushing data is used for instructing a target livestreaming platform to display the virtual livestreaming of the virtual character.

After the sound recording system records the sound recording data of the real subject, the sound recording data are recorded into the video synthesis system. The video synthesis system determines sound data of the virtual character according to the recorded sound recording data.

Optionally, the sound recording data of the real subject are the sound data of the virtual character. Alternatively, the sound recording data of the real subject are subjected to preset sound processing to obtain the sound data of the virtual character. Alternatively, the sound recording data are replaced with dubbing data to obtain the sound data of the virtual character. This is not limited in this embodiment of the present disclosure.

After the virtual camera position and pose tracking system captures the virtual camera position and pose data, the virtual camera position and pose data are recorded into the video synthesis system. The video synthesis system determines a preview camera viewing angle of a to-be-displayed animation video according to the recorded virtual camera position and pose data.

Optionally, the target feature data and the reference data both carry timecodes. The video stream pushing data corresponding to the virtual character are determined according to the target feature data and the reference data, including aligning the target feature data and the reference data according to the time code corresponding to the target feature data and the time code corresponding to the reference data; and determining the video stream pushing data corresponding to the virtual character according to the target feature data and reference data after alignment processing.

The target feature data and reference data after alignment processing are synchronized in time.

Exemplarily, the motion data, the face data, the sound recording data, and the virtual camera position and pose data all carry time codes. The video synthesis system aligns the imported motion data, face data, sound recording data, and virtual camera position and pose data according to the time codes, and then performs the alignment processing and the render processing to obtain the video stream pushing data corresponding to the virtual character.

Optionally, the video synthesis system determines the video stream pushing data corresponding to the virtual character according to the target feature data and reference data after alignment processing, including obtaining an animation picture according to the virtual camera position and pose data and target feature data after alignment processing, where the virtual camera position and pose data is used for instructing a preview camera viewing angle of a to-be-generated animation picture; rendering the animation picture to obtain a render result; and determining the video stream pushing data corresponding to the virtual character according to the render result and the sound recording data. The virtual camera position and pose data include the position of the virtual camera, the direction of the virtual camera, and parameters of the virtual camera. For example, the parameters of the virtual camera include focal length.

Optionally, the video synthesis system acquires video recording data carrying a time code. The video recording data include video data obtained by recording performance content of the real subject. The video recording data may serve as reference data for to-be-generated video stream pushing data.

Optionally, when a first trigger instruction is received, the video synthesis system determines the video stream pushing data corresponding to the virtual character according to the target feature data and preset motion data. The preset motion data is used for instructing a preset skeletal motion of the virtual character.

Optionally, when the first trigger instruction is received, the video synthesis system obtains an animation picture according to the virtual camera position and pose data and target feature data after alignment processing and the preset motion data.

Optionally, when a second trigger instruction is received, the video synthesis system determines the video stream pushing data corresponding to the virtual character according to the target feature data and preset special effect data. The preset special effect data is used for instructing a preset virtual special effect of the virtual character.

Optionally, when the second trigger instruction is received, the video synthesis system obtains an animation picture according to the virtual camera position and pose data and target feature data after alignment processing and the preset special effect data.

It is to be noted that for related details of adding the preset motion data and/or the preset special effect data by the video synthesis system in the process of generating the animation picture, reference may be made to the related description in the preceding embodiments. Details are not described herein.

In step 507, the video stream pushing data corresponding to the virtual character are sent to the target livestreaming platform.

The computer device sends the video stream pushing data corresponding to the virtual character to the target livestreaming platform. The target livestreaming platform is used for displaying the virtual livestreaming of the virtual character. It is to be noted that, for related details, reference may be made to the related description in the preceding embodiments. Details are not described herein.

In an illustrative example, the real subject is an actor, the virtual subject is a virtual actor model, and the virtual character is a preset virtual animation character. A motion capture system captures positions of multiple reflection points on the actor through an infrared camera and reconstructs motion data of the actor into motion data of the virtual actor model according to the positions of multiple reflection points. A motion redirection system redirects the motion data of the virtual actor model to obtain motion data of the virtual animation character. A face capture system acquires face video frames of the actor through a head-mounted RGB camera worn by the actor and converts the face video frames of the actor into face data of the virtual actor model. A face redirection system redirects the face data of the virtual actor model to obtain the motion data of the virtual animation character. When a skeletal motion of the actor and a facial emotion of the actor are captured, a sound recording system records the sound of the actor to obtain sound recording data. At the same time, a virtual camera position and pose tracking system records the position, pose, and motion trajectory of the virtual camera to obtain virtual camera position and pose data. The preceding systems synchronize based on the same time code. A video synthesis system acquires multiple imported data. The multiple data include motion data (including limb motion data and gesture motion data), face data (including expression data and eye expression data), sound recording data, and virtual camera position and pose data. The video synthesis system synchronizes the multiple imported data according to a time code. After synchronization, the video synthesis system determines video stream pushing data corresponding to the virtual animation character according to the multiple imported data and imported preset motion data and preset special effect data and pushes the video stream pushing data to a target livestreaming platform.

Optionally, the method also includes acquiring prop motion data of a real prop used by the real subject during the performance; determining, according to the real prop data, prop motion data of a virtual prop used by the virtual character; and determining the video stream pushing data corresponding to the virtual character according to target feature data and the prop motion data of the virtual prop.

During the performance of the real subject, a prop capture system acquires the prop motion data of the real prop used by the real subject. The prop capture system converts the prop motion data of the real prop into prop motion data of a virtual intermediate prop. A prop redirection system redirects the prop motion data of the virtual intermediate prop to obtain the prop motion data of the virtual prop.

In an illustrative example, the real prop is a soccer ball. When an actor plays a soccer ball, the soccer ball may move and rotate. The prop capture system captures the motion of the soccer ball to obtain prop motion data of the soccer ball and performs prop reconstruction according to the prop motion data of the soccer ball to obtain prop motion data of a virtual intermediate soccer ball. The prop redirection system redirects the prop motion data of the virtual intermediate soccer ball to obtain prop motion data of a virtual soccer ball.

In another illustrative example, the real prop is a sword. When an actor waves the sword, the sword moves. The prop capture system captures the motion of the sword to obtain prop motion data of the sword and performs prop reconstruction according to the prop motion data of the sword to obtain prop motion data of a virtual intermediate sword. The prop redirection system redirects the prop motion data of the virtual intermediate sword to obtain prop motion data of a virtual sword.

It is to be noted that the manner in which the prop capture system performs prop capture may be analogous to the manner in which the motion capture system performs motion capture. The manner in which the prop redirection system performs redirection processing may be analogous to the manner in which the motion redirection system performs redirection processing. Details are not described herein.

Another point to be noted is that the capture and redirection process of the motion data, the capture and redirection process of the face data, the acquisition process of the reference data, and the capture and redirection process of the prop motion data may be executed in parallel, regardless of the sequence.

Optionally, the prop motion data of the virtual prop also carry a time code. The video synthesis system aligns the target feature data, the reference data, and the prop motion data according to the time code corresponding to the target feature data, the time code corresponding to the reference data, and the time code corresponding to the prop motion data; and determines the video stream pushing data corresponding to the virtual character according to the target feature data, reference data, and prop motion data after alignment processing.

Optionally, the video synthesis system obtains, after alignment processing, an animation picture according to the virtual camera position and pose data, the target feature data, and the prop motion data; renders the animation picture to obtain a render result; and determines the video stream pushing data corresponding to the virtual character according to the render result and the sound recording data.

It is to be noted that the manner in which the video synthesis system determines the video stream pushing data corresponding to the virtual character according to the target feature data, reference data, and prop motion data after alignment processing may be analogous to the manner in which the video synthesis system determines the video stream pushing data corresponding to the virtual character according to the target feature data and reference data after alignment processing. Details are not described herein.

In summary, according to this embodiment of the present disclosure, the method also includes converting real feature data into virtual feature data of a virtual subject. The virtual subject is a virtual model obtained by restoring and reconstructing a real subject. The virtual feature data include motion data and face data of the virtual subject. The motion data include limb motion data and/or gesture motion data. The face data include expression data and/or eye expression data. Thus, the skeleton motion and facial emotion details of the virtual character can be more accurately reflected so that the generated virtual character is more vivid and natural, and the virtual livestreaming display effect of the virtual character is ensured.

According to this embodiment of the present disclosure, the method also includes determining, according to the target feature data and the reference data, the video stream pushing data corresponding to the virtual character, where the reference data include sound recording data and/or virtual camera position and pose data of the real subject during a performance; and sending the video stream pushing data corresponding to the virtual character to a target livestreaming platform. That is, the "WYSIWYG" method of virtual shooting is adopted. Thus, the performance of the real subject can be seen in real time on the spot, and the performance can be confirmed on the spot, thereby improving the shooting efficiency.

According to this embodiment of the present disclosure, the target feature data and the reference data both carry timecodes. The method also includes aligning the target feature data and the reference data according to the time code corresponding to the target feature data and the time code corresponding to the reference data; and determining the video stream pushing data corresponding to the virtual character according to the target feature data and reference data after alignment processing. Thus, the skeleton motion, facial emotion, and sound of the virtual character and the position and pose of the virtual camera are synchronized. Therefore, the display details of the virtual livestreaming of the virtual character are enriched, the natural fluency of the virtual livestreaming is ensured, and the display effect of the virtual livestreaming is further ensured.

According to the virtual livestreaming method provided in this embodiment of the present disclosure, in one aspect, finer motion content can be captured by a motion capture system, a more stable livestreaming picture is implemented, and the stability of the virtual livestreaming is ensured. In another aspect, preset materials stored in advance, such as lighting, a hair material, a scenario material, a scenario texture, or a scenario map, can be directly invoked during virtual livestreaming, thereby ensuring the display effect of the virtual livestreaming. In another aspect, preset motion data may be added through the first trigger instruction during virtual livestreaming. That is, the motion data of the virtual character are fused with the preset motion data so that the virtual character completes the motion that the real subject is difficult to complete in real time, further improving the display effect of the virtual livestreaming. In another aspect, preset special effect data may be added through the second trigger instruction during virtual livestreaming, thereby increasing the richness of the display content of the virtual livestreaming.

The virtual livestreaming method may be applied to a single-person virtual livestreaming application scenario or a multi-person virtual livestreaming scenario. Capture of a single person or multiple persons can be implemented when capturing. That is, output of a single virtual character or multiple virtual characters can be implemented in the same virtual livestreaming picture. In the case of multi-person capture, the interaction between actors, for example, hugging and shaking hands, may be captured. Interaction of virtual characters is output in the virtual livestreaming scenario according to the interaction between multiple actors. In addition to outputting the interaction of virtual characters in the virtual livestreaming scenario, the interactive livestreaming of virtual characters and real subjects in the same camera can also be implemented, which is similar to the interactive livestreaming of virtual persons and real persons in the same camera.

The stream pushing livestreaming of the virtual livestreaming method can be used in the field of VR/AR virtual livestreaming. For this scenario, the virtual camera angle depends on the head pose of a user. The user wears a VR helmet. Each frame of image is rendered in real time according to the head pose of the user and the real-time position and pose of the virtual camera so that the user sees the VR/AR virtual livestreaming. Virtual livestreaming can also be used in the field of holographic display.

The virtual livestreaming technology can also be applied to real-time offline livestreaming and interaction of virtual characters. For example, virtual characters are displayed on the spot such as the opening of shopping malls, instead of Internet livestreaming. Offline livestreaming in virtual livestreaming can support the interaction between virtual characters and the interaction between real persons and virtual characters.

The following is an embodiment of an apparatus according to the embodiments of the present disclosure. For portions not described in detail in the embodiment of the apparatus, reference may be made to the technical details disclosed in the preceding method embodiments.

Figure 6:
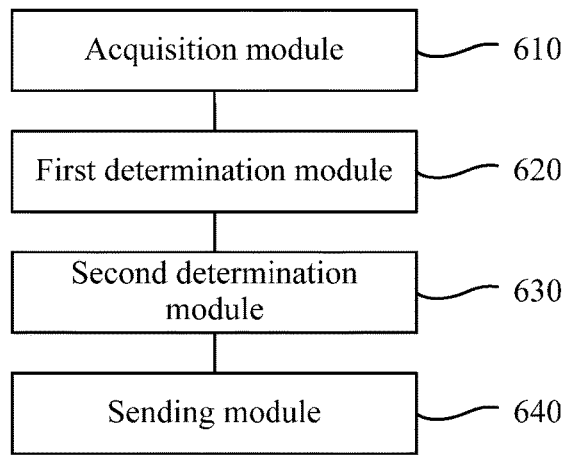
FIG. 6 is a diagram illustrating the structure of a virtual livestreaming apparatus according to an example embodiment of the present disclosure.

Referring to FIG. 6, FIG. 6 is a diagram illustrating the structure of a virtual livestreaming apparatus according to an example embodiment of the present disclosure. The virtual livestreaming apparatus may be implemented as part or all of a user equipment by relying on software, hardware, or a combination of software and hardware. The apparatus includes an acquisition module 610, a first determination module 620, a second determination module 630, and a sending module 640.

The acquisition module 610 is configured to acquire real feature data of a real subject. The real feature data include motion data and face data of the real subject during a performance.

The first determination module 620 is configured to determine target feature data of a virtual character according to the real feature data. The virtual character is a preset animation model. The target feature data include motion data and face data of the virtual character.

The second determination module 630 is configured to determine video stream pushing data corresponding to the virtual character according to the target feature data.

The sending module 640 is configured to send the video stream pushing data corresponding to the virtual character to a target livestreaming platform. The video stream pushing data is used for instructing the target livestreaming platform to display virtual livestreaming of the virtual character.

In a possible embodiment, the second determination module 630 is also configured to determine the video stream pushing data corresponding to the virtual character according to the target feature data and preset motion data when a first trigger instruction is received.

The preset motion data is used for instructing a preset skeletal motion of the virtual character.

In another possible embodiment, the second determination module 630 is also configured to determine the video stream pushing data corresponding to the virtual character according to the target feature data and preset special effect data when a second trigger instruction is received.

The preset special effect data is used for instructing a preset virtual special effect of the virtual character.

In another possible embodiment, the second determination module 630 is also configured to acquire reference data, where the reference data include sound recording data and/or virtual camera position and pose data of the real subject during the performance; and determine video stream pushing data corresponding to the virtual character according to the target feature data and the reference data.

In another possible embodiment, the target feature data and the reference data both carry timecodes. The second determination module 630 is also configured to align the target feature data and the reference data according to the time code corresponding to the target feature data and the time code corresponding to the reference data; and determine the video stream pushing data corresponding to the virtual character according to the target feature data and reference data after alignment processing.

In another possible embodiment, the second determination module 630 is also configured to obtain an animation picture according to the virtual camera position and pose data and target feature data after alignment processing, where the virtual camera position and pose data is used for instructing a preview camera viewing angle of a to-be-generated animation picture; render the animation picture to obtain a render result; and determine the video stream pushing data corresponding to the virtual character according to the render result and the sound recording data.

In another possible embodiment, the acquisition module 610 is also configured to acquire motion data of the real subject, where the motion data include limb motion data and/or gesture motion data; and acquire face data of the real subject, where the face data include expression data and/or eye expression data.

In another possible embodiment, the acquisition module 610 is also configured to acquire position data corresponding to each of multiple optical mark points preset on a limb of the real subject, and determine limb motion data of the real subject according to the position data corresponding to the each of the multiple optical mark points; and/or, acquire position data corresponding to each of multiple optical mark points preset on a hand of the real subject, and determine gesture motion data of the real subject according to the position data corresponding to the each of the multiple optical mark points.

In another possible embodiment, the acquisition module 610 is also configured to acquire face video frames of the real subject, where the face video frames are video frames including the face of the real subject, and the face video frames are used for instructing face data of the real subject.

In another possible embodiment, the first determination module 620 is also configured to convert real feature data into virtual feature data of a virtual subject, where the virtual subject is a virtual model obtained by restoring and reconstructing a real subject, and the virtual feature data include motion data and face data of the virtual subject; and redirecting the virtual feature data to obtain the target feature data of the virtual character.

In another possible embodiment, the first determination module 620 is also configured to redirect the motion data of the virtual subject to obtain the motion data of the virtual character, where the motion data include limb motion data and/or gesture motion data; and redirect face data of the virtual subject to obtain face data of the virtual character, where the face data include expression data and/or eye expression data.

In another possible embodiment, the first determination module 620 is also configured to acquire a first correspondence between skeleton data of the virtual subject and skeleton data of the virtual character, where the skeleton data is used for instructing topological features of skeletons; and redirect the motion data of the virtual subject to the virtual character according to the first correspondence to obtain the motion data of the virtual character.

In another possible embodiment, the first determination module 620 is also configured to acquire a second correspondence between the face data of the virtual subject and the face data of the virtual character, where the face data is used for instructing facial structure features and emotional style features; and redirect the face data of the virtual subject to the virtual character according to the second correspondence to obtain the face data of the virtual character.

In another possible embodiment, the apparatus also includes a display module.

The display module is configured to drive and display a skinned mesh motion of the virtual character according to the motion data of the virtual character and a binding relationship between skeletons of the virtual character and skinned mesh.

In another possible embodiment, the apparatus also includes the acquisition module 610.

The acquisition module 610 is also configured to acquire video recording data carrying a time code. The video recording data include video data obtained by recording performance content of the real subject.

In another possible embodiment, the acquisition module 610 is also configured to acquire prop motion data of a real prop used by the real subject during the performance.

The first determination module 620 is also configured to determine, according to the real prop data, prop motion data of a virtual prop used by the virtual character.

The second determination module 630 is also configured to determine the video stream pushing data corresponding to the virtual character according to the target feature data and the prop movement data of the virtual prop.

It is to be noted that the apparatus provided in the preceding embodiment, when implementing functions of the apparatus, is exemplified merely by the division of the preceding functional modules. In practical application, the preceding functions can be allocated to different functional modules according to actual needs, that is, the internal structure of the device is divided into different functional modules to perform part or all of the preceding functions.

As for the apparatus in the preceding embodiment, the specific manner of the execution operation of each module has been described in detail in the embodiments of the method and is not described in detail herein.

An embodiment of the present disclosure also provides a computer device. The computer device includes a processor and a memory configured to store a processor-executable instruction. The processor is configured to implement the steps executed by the computer device in the preceding method embodiments.

An embodiment of the present disclosure also provides a virtual livestreaming system. The virtual livestreaming system includes a motion capture garment, a first camera, a helmet, and a computer device.

The motion capture garment is provided with multiple optical mark points.

The first camera is configured to capture motion data of a real subject during a performance.

A second camera is disposed on the helmet. The second camera is configured to capture face data of the real subject during the performance.

The computer device is configured to execute the steps executed by the computer device in the preceding method embodiments.

An embodiment of the present disclosure also provides a non-transitory computer-readable storage medium. The non-transitory computer-readable storage medium stores a computer program instruction. The computer program instruction, when executed by a processor, implements the method in the preceding method embodiments.

The present disclosure may be a system, method, and/or computer program product. The computer program product may include a computer-readable storage medium having a computer-readable program instruction embodied thereon for causing a processor to implement various aspects of the present disclosure.

The computer-readable storage medium may be a tangible device that may hold and store instructions for use by an instruction execution device. The computer-readable storage medium, for example, may be, but is not limited to, an electronic storage device, a magnetic storage device, an optical storage device, an electromagnetic storage device, or a semiconductor storage device, or any suitable combination thereof. More specific examples of the computer-readable storage medium include (non-exhaustive list): a portable computer disk, a hard disk, a random-access memory (RAM), a read-only memory (ROM), an erasable programmable read-only memory (EPROM), a flash memory, a static random-access memory (SRAM), a portable compact disc read-only memory (CD-ROM), a digital versatile disc (DVD), a memory stick, a floppy disk, a mechanical coding device, a punched card or a convex structure in a groove on which instructions are stored, or any suitable combination thereof. The computer-readable storage medium used herein is not to be construed as a transient signal itself, such as a radio wave or other freely propagating electromagnetic wave, an electromagnetic wave propagating through a waveguide or other transmission medium (for example, an optical pulse through a fiber optic cable), or an electrical signal transmitted through a wire.

The computer-readable program instruction described herein may be downloaded from a computer-readable storage medium to various computing/processing devices, or via a network, such as the Internet, a local area network, a wide area network, and/or a wireless network, to an external computer or an external storage device. The network may include copper transmission cables, fiber optic transmission, wireless transmission, routers, firewalls, switches, gateway computers, and/or edge servers. A network adapter card or network interface in each computing/processing device receives the computer readable program instruction from the network and forwards the computer readable program instruction to store the computer readable program instruction in a computer readable storage medium in the respective computing/processing device.

The computer program instruction used to execute the operation of the present disclosure may be an assembly instruction, an instruction set architecture (ISA) instruction, a machine instruction, a machine-related instruction, a microcode, a firmware instruction, state setting data, or source codes or object codes written in any combination of one or more programming languages. The programming languages include object-oriented programming languages such as Smalltalk and C++, as well as conventional procedural programming languages such as C or similar programming languages. The computer readable program instruction may be executed entirely or partially on a user computer, as a separate software package, partially on the user computer and partially on a remote computer, or entirely on the remote computer or a sever. In the case where the remote computer is involved, the remote computer may be connected to the user computer via any type of network including a local area network (LAN) or a wide area network (WAN) or connected to an external computer (for example, through the Internet using an Internet service provider). In some embodiments, an electronic circuit, such as a programmable logic circuit, a field-programmable gate array (FPGA), or a programmable logic array (PLA), is personalized by using the state information of the computer-readable program instruction. The electronic circuit may execute the computer-readable program instruction, thereby implementing various aspects of the present disclosure.

Various aspects of the present disclosure are described with reference to flowcharts and/or block diagrams of methods, apparatuses (systems), and computer program products according to the embodiments of the present disclosure. It is to be understood that each block in the flowcharts and/or block diagrams and a combination of blocks in the flowcharts and/or block diagrams may be implemented by the computer readable program instruction.

These computer readable program instructions may be provided to a general-purpose computer, a special-purpose computer, or a processor of another programmable data processing apparatus to produce a machine so that the instructions executed by a computer or the processor of another programmable data processing apparatus produce an apparatus for implementing functions/actions specified in one or more blocks in the flowcharts and/or the block diagrams. These computer readable program instructions may also be stored in a computer-readable storage medium. These instructions cause a computer, a programmable data processing apparatus, and/or another device to operate in a particular manner. Thus, the computer-readable medium storing instructions includes an article of manufacture including instructions which implement various aspects of functions/actions specified in one or more blocks in the flowcharts and/or the block diagrams.

These computer readable program instructions may also be loaded onto a computer, another programmable data processing apparatus, or another device. Thus, a series of operation steps are executed on the computer, another programmable data processing apparatus, or another device to produce the process implemented by a computer. Therefore, instructions executed on a computer, another programmable data processing apparatus, or another device implement the functions/actions specified in one or more blocks in the flowcharts and/or the block diagrams.

The flowcharts and block diagrams in the drawings show possible architectures, functions, and operations of the system, method, and computer program product according to multiple embodiments of the present disclosure. In this regard, each block in the flowcharts and block diagrams may represent a module, a program segment, or part of instructions that contains one or more executable instructions for implementing specified logical functions. In some alternative implementations, the functions marked in the blocks may occur in an order different from that marked in the drawings. For example, two sequential blocks may, in fact, be executed substantially concurrently, or sometimes executed in the reverse order, which depends on the involved functions. It is to be noted that each block in the block diagrams and/or flowcharts, and combinations of blocks in the block diagrams and/or flowcharts may be implemented by not only specific-purpose hardware-based systems that execute specified functions or actions, but also combinations of specific-purpose hardware and computer instructions.

various embodiments of the present disclosure. The preceding description is illustrative, and not exhaustive, and not limited to the disclosed various embodiments. Without departing from the scope and spirit of the described various embodiments, various modifications and variations are apparent to those skilled in the art. The selection of terms used herein is intended to best explain the principles of the various embodiments, practical applications, or technical improvements to technologies in the marketplace, or to enable others of ordinary skill in the art to understand the various embodiments disclosed herein.

What is claimed is:

1. A virtual livestreaming method, comprising:
acquiring real feature data of a real subject, wherein the real feature data comprise motion data and face data of the real subject during a performance;
determining target feature data of a virtual character according to the real feature data, wherein the virtual character is a preset animation model, and the target feature data comprise motion data and face data of the virtual character;
determining video stream pushing data corresponding to the virtual character according to the target feature data; and
sending the video stream pushing data corresponding to the virtual character to a target livestreaming platform, wherein the video stream pushing data is used for instructing the target livestreaming platform to display virtual livestreaming of the virtual character,
wherein determining the video stream pushing data corresponding to the virtual character according to the target feature data comprises:
acquiring reference data, wherein the reference data comprise at least one of sound recording data or virtual camera position and pose data of the real subject during the performance; and
determining the video stream pushing data corresponding to the virtual character according to the target feature data and the reference data;
wherein the virtual camera position and pose data is used for instructing a preview camera viewing angle of a to-be-generated animation picture, and the virtual camera position and pose data comprises: a position of a virtual camera, a direction of the virtual camera, and parameters of the virtual camera;
wherein determining the target feature data of the virtual character according to the real feature data comprises:
converting the real feature data into virtual feature data of a virtual subject, wherein the virtual subject is a virtual model obtained by restoring and reconstructing the real subject, and the virtual feature data comprise motion data and face data of the virtual subject; and
redirecting the virtual feature data to obtain the target feature data of the virtual character;
wherein redirecting the virtual feature data to obtain the target feature data of the virtual character comprises:
redirecting the face data of the virtual subject to obtain the face data of the virtual character, wherein the face data comprise at least one of expression data or eye expression data;
wherein redirecting the face data of the virtual subject to obtain the face data of the virtual character comprises:
acquiring a second correspondence between the face data of the virtual subject and the face data of the virtual character, wherein the face data is used for instructing facial structure features and emotional style features; and
redirecting the face data of the virtual subject to the virtual character according to the second correspondence to obtain the face data of the virtual character;
wherein the second correspondence is a pre-trained neural network model for representing a correlation between face data of the virtual subject and face data of the virtual character, or the second correspondence is a preset mathematical model, and the preset mathematical model comprises a model coefficient between face data of the virtual subject and face data of the virtual character.

2. The method according to claim 1, wherein determining the video stream pushing data corresponding to the virtual character according to the target feature data comprises:
determining the video stream pushing data corresponding to the virtual character according to the target feature data and preset motion data when a first trigger instruction is received, wherein
the preset motion data is used for instructing a preset skeletal motion of the virtual character.

3. The method according to claim 1, wherein determining the video stream pushing data corresponding to the virtual character according to the target feature data comprises:
determining the video stream pushing data corresponding to the virtual character according to the target feature data and preset special effect data when a second trigger instruction is received, wherein
the preset special effect data is used for instructing a preset virtual special effect of the virtual character.

4. The method according to claim 1, wherein the target feature data and the reference data both carry timecodes, and determining the video stream pushing data corresponding to the virtual character according to the target feature data and the reference data comprises:
aligning the target feature data and the reference data according to the time code corresponding to the target feature data and the time code corresponding to the reference data; and
determining the video stream pushing data corresponding to the virtual character according to the target feature data and reference data after alignment processing.

5. The method according to claim 4, wherein determining the video stream pushing data corresponding to the virtual character according to the target feature data and reference data after alignment processing comprises:
obtaining an animation picture according to the virtual camera position and pose data and the target feature data after alignment processing;
rendering the animation picture to obtain a render result; and
determining the video stream pushing data corresponding to the virtual character according to the render result and the sound recording data.

6. The method according to claim 1, wherein acquiring the real feature data of the real subject comprises:
acquiring the motion data of the real subject, wherein the motion data comprise at least one of limb motion data or gesture motion data; and
acquiring the face data of the real subject, wherein the face data comprise at least one of expression data or eye expression data.

7. The method according to claim 6, wherein acquiring the motion data of the real subject comprises at least one of:
acquiring position data corresponding to each of a plurality of optical mark points preset on a limb of the real subject, and determining the limb motion data of the real subject according to the position data corresponding to the each of the plurality of optical mark points; or, acquiring position data corresponding to each of a plurality of optical mark points preset on a hand of the real subject, and determining the gesture motion data of the real subject according to the position data corresponding to each of the plurality of optical mark points.

8. The method according to claim 6, wherein acquiring the face data of the real subject comprises:

acquiring face video frames of the real subject, wherein the face video frames are video frames comprising a face of the real subject, and the face video frames are used for instructing the face data of the real subject.

9. The method according to claim 1, wherein redirecting the virtual feature data to obtain the target feature data of the virtual character comprises:

redirecting the motion data of the virtual subject to obtain the motion data of the virtual character, wherein the motion data comprise at least one of limb motion data or gesture motion data.

10. The method according to claim 9, wherein redirecting the motion data of the virtual subject to obtain the motion data of the virtual character comprises:

acquiring a first correspondence between skeleton data of the virtual subject and skeleton data of the virtual character, wherein the skeleton data is used for instructing topological features of skeletons; and redirecting the motion data of the virtual subject to the virtual character according to the first correspondence to obtain the motion data of the virtual character.

11. The method according to any one of claim 1, after determining the target feature data of the virtual character according to the real feature data, further comprising:

driving and displaying a skinned mesh motion of the virtual character according to the motion data of the virtual character and a binding relationship between skeletons of the virtual character and skinned mesh.

12. The method according to any one of claim 1, before generating an animation of the virtual character according to the target feature data, further comprising:

acquiring video recording data carrying a time code, wherein the video recording data comprise video data obtained by recording performance content of the real subject.

13. The method according to any one of claim 1, further comprising:

acquiring prop motion data of a real prop used by the real subject during the performance; and determining, according to the real prop data, prop motion data of a virtual prop used by the virtual character;

wherein determining the video stream pushing data corresponding to the virtual character according to the target feature data, comprising:

determining the video stream pushing data corresponding to the virtual character according to the target feature data and the prop motion data of the virtual prop.

14. A virtual livestreaming system, comprising:

a motion capture garment provided with a plurality of optical mark points;

a first camera configured to capture motion data of a real subject during a performance;

a helmet on which a second camera configured to capture face data of the real subject during the performance is disposed; and a computer device configured to execute the method according to claim 1.

15. A non-transitory computer-readable storage medium storing a computer program instruction, wherein the computer program instruction, when executed by a processor, implements the method according to claim 1.

16. A computer device, comprising a processor and a memory configured to store a processor-executable instruction, wherein the processor is configured to:

acquire real feature data of a real subject, wherein the real feature data comprise motion data and face data of the real subject during a performance;

determine target feature data of a virtual character according to the real feature data, wherein the virtual character is a preset animation model, and the target feature data comprise motion data and face data of the virtual character;

determine video stream pushing data corresponding to the virtual character according to the target feature data; and send the video stream pushing data corresponding to the virtual character to a target livestreaming platform, wherein the video stream pushing data is used for instructing the target livestreaming platform to display virtual livestreaming of the virtual character, wherein to determine the video stream pushing data corresponding to the virtual character according to the target feature data comprises:

acquiring reference data, wherein the reference data comprise at least one of sound recording data or virtual camera position and pose data of the real subject during the performance; and determining the video stream pushing data corresponding to the virtual character according to the target feature data and the reference data;

wherein the virtual camera position and pose data is used for instructing a preview camera viewing angle of a to-be-generated animation picture, and the virtual camera position and pose data comprises: a position of a virtual camera, a direction of the virtual camera, and parameters of the virtual camera;

wherein to determine the target feature data of the virtual character according to the real feature data comprises:

converting the real feature data into virtual feature data of a virtual subject, wherein the virtual subject is a virtual model obtained by restoring and reconstructing the real subject, and the virtual feature data comprise motion data and face data of the virtual subject; and redirecting the virtual feature data to obtain the target feature data of the virtual character;

wherein redirecting the virtual feature data to obtain the target feature data of the virtual character comprises:

redirecting the face data of the virtual subject to obtain the face data of the virtual character, wherein the face data comprise at least one of expression data or eye expression data;

wherein redirecting the face data of the virtual subject to obtain the face data of the virtual character comprises:

acquiring a second correspondence between the face data of the virtual subject and the face data of the virtual character, wherein the face data is used for instructing facial structure features and emotional style features; and redirecting the face data of the virtual subject to the virtual character according to the second correspondence to obtain the face data of the virtual character;

wherein the second correspondence is a pre-trained neural network model for representing a correlation between face data of the virtual subject and face data of the virtual character, or the second correspondence is a preset mathematical model, and the preset mathematical model comprises a model coefficient between face data of the virtual subject and face data of the virtual character.

* * * * *